(12) United States Patent
Ogura et al.

(10) Patent No.: US 9,409,785 B2
(45) Date of Patent: Aug. 9, 2016

(54) FE(II)-SUBSTITUTED MEL-TYPE ZEOLITE, PRODUCTION METHOD THEREFOR AND GAS ADSORBENT INCLUDING SAME, AND NITRIC OXIDE AND HYDROCARBON REMOVAL METHOD

(71) Applicants: UniZeo Co., Ltd., Tokyo (JP); THE UNIVERSITY OF TOKYO, Tokyo (JP)

(72) Inventors: Masaru Ogura, Tokyo (JP); Keiji Itabashi, Tokyo (JP); Tatsuya Okubo, Tokyo (JP); Shanmugam Palani Elangovan, Tokyo (JP)

(73) Assignees: UniZeo Co., Ltd., Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 14/414,500

(22) PCT Filed: Jul. 16, 2013

(86) PCT No.: PCT/JP2013/069250
§ 371 (c)(1),
(2) Date: Jan. 13, 2015

(87) PCT Pub. No.: WO2014/013968
PCT Pub. Date: Jan. 23, 2014

(65) Prior Publication Data
US 2015/0166356 A1 Jun. 18, 2015

(30) Foreign Application Priority Data

Jul. 18, 2012 (JP) .................. 2012-159149

(51) Int. Cl.
*B01D 53/02* (2006.01)
*C01B 39/02* (2006.01)
(Continued)

(52) U.S. Cl.
CPC ............. *C01B 39/02* (2013.01); *B01D 53/02* (2013.01); *B01J 20/18* (2013.01); *B01J 20/186* (2013.01);
(Continued)

(58) Field of Classification Search
CPC ............ B01D 2253/1085; B01D 2253/1122; B01D 2253/306; B01D 2253/311; B01D 2256/20; B01D 2257/404; B01D 2257/702; B01D 53/02; B01D 53/56; B01D 53/72; B01D 53/81; B01J 20/18; B01J 20/186; B01J 20/28061; B01J 20/28064; B01J 20/28071; B01J 20/3071; B01J 20/3085; C01B 39/02; C01B 39/065; C01B 39/36; C01B 39/46

See application file for complete search history.

(56) References Cited

U.S. PATENT DOCUMENTS

| 5,236,880 A | * | 8/1993 | Chapman | ................. B01J 29/46 502/66 |
| 5,524,432 A | * | 6/1996 | Hansel | ............... B01D 53/8625 60/274 |

(Continued)

FOREIGN PATENT DOCUMENTS

| JP | 07-060069 A | 3/1995 |
| JP | 2007-076990 A | 3/2007 |

(Continued)

OTHER PUBLICATIONS

Anunziata et al., "Fe-containing ZSM-11 zeolites as active catalyst for SCR of NOx Part I. Synthesis, characterization by XRD, BET and FTIR and catalytic properties", Applied Catalysis A: General, Jun. 18, 2004, (pp. 93-101 ), vol. 264, No. 1, Elsevier Science, Amsterdam, NL; cited in European Search Report dated Jul. 8, 2015.

(Continued)

*Primary Examiner* — Christopher P Jones
(74) *Attorney, Agent, or Firm* — Westerman, Hattori, Daniels & Adrian, LLP

(57) ABSTRACT

The purpose of/problem addressed by the present invention is to provide: an Fe(II)-substituted MEL-type zeolite useful for the catalytic removal of a variety of gases; and a production method therefor. The $SiO_2/Al_2O_3$ ratio in this Fe(II)-substituted MEL-type zeolite is in the range of 10-30 inclusive. This Fe(II)-substituted MEL-type zeolite is obtained by being subjected to ionic exchange with Fe(II) ions. It is preferable that the Fe(II) loading amount be in the range of 0.001-0.4 mmol/g of the Fe(II)-substituted MEL-type zeolite. It is preferable that the Fe(II)-substituted MEL-type zeolite be produced using a method in which an MEL-type zeolite having an $SiO_2/Al_2O_3$ ratio in the range of 10-30 inclusive is dispersed in an Fe(II) water-soluble-compound aqueous solution, and then mixed and agitated to cause the MEL-type zeolite to carry Fe(II) ions.

19 Claims, 1 Drawing Sheet

(51) Int. Cl.
*B01J 20/18* (2006.01)
*B01J 20/28* (2006.01)
*B01J 20/30* (2006.01)
*C01B 39/06* (2006.01)
*C01B 39/40* (2006.01)

(52) U.S. Cl.
CPC ...... *B01J 20/28061* (2013.01); *B01J 20/28064* (2013.01); *B01J 20/28071* (2013.01); *B01J 20/3071* (2013.01); *B01J 20/3085* (2013.01); *C01B 39/065* (2013.01); *C01B 39/40* (2013.01); *B01D 2253/1085* (2013.01); *B01D 2253/1122* (2013.01); *B01D 2253/306* (2013.01); *B01D 2253/311* (2013.01); *B01D 2256/20* (2013.01); *B01D 2257/404* (2013.01); *B01D 2257/702* (2013.01)

(56) References Cited

U.S. PATENT DOCUMENTS

| | | | |
|---|---|---|---|
| 6,347,627 B1 * | 2/2002 | Frankie | A62B 21/00 128/200.24 |
| 6,419,894 B1 * | 7/2002 | Piccione | C01B 37/00 423/705 |
| 2002/0127163 A1 * | 9/2002 | Chen | B01D 53/8625 423/239.2 |
| 2004/0110627 A1 | 6/2004 | Schwefer et al. | |
| 2006/0079725 A1 | 4/2006 | Li et al. | |
| 2007/0170093 A1 * | 7/2007 | Jeong | B01J 21/12 208/110 |
| 2007/0248517 A1 | 10/2007 | Nagata et al. | |
| 2007/0293714 A1 * | 12/2007 | Long | B01J 29/405 585/899 |
| 2008/0274875 A1 | 11/2008 | Fecant et al. | |
| 2010/0137127 A1 | 6/2010 | Kanazawa | |
| 2011/0113628 A1 * | 5/2011 | Agarwal | C01B 33/1071 29/890 |
| 2012/0004481 A1 * | 1/2012 | Guillon | C10G 50/00 585/315 |
| 2012/0298554 A1 * | 11/2012 | Negiz | B01J 29/06 208/111.01 |
| 2013/0156690 A1 | 6/2013 | Itabashi et al. | |

FOREIGN PATENT DOCUMENTS

| | | |
|---|---|---|
| JP | 2008-508993 A | 3/2008 |
| JP | 2008-255005 A | 10/2008 |
| JP | 2008-264702 A | 11/2008 |
| JP | 2012-126632 A | 7/2012 |
| WO | 02/072244 A2 | 9/2002 |
| WO | 2006/011575 A1 | 2/2006 |

OTHER PUBLICATIONS

European Search Report dated Jul. 8, 2015, issued in counterpart application No. 13820072.0 (5 pages).
International Serach Report dated Aug. 20, 2013, issued in corresponding applicaton No. PCT/JP2013/069250.
Ogura Masaru, et al., "Stabilization of bare divalent Fe(II) cations in Al-rich beta zeolites for superior NO adsorption", Journal of Catalysis, 2014, vol. 315, pp. 1-5.
Kawakami, Koutarou, et al., "Theoretical investigation of novel two-step decomposition of nitric oxide over Fe(II) ion-exchanged zeolites using DFT calculations", Catalysis Today, 2014, (8 pages).

* cited by examiner

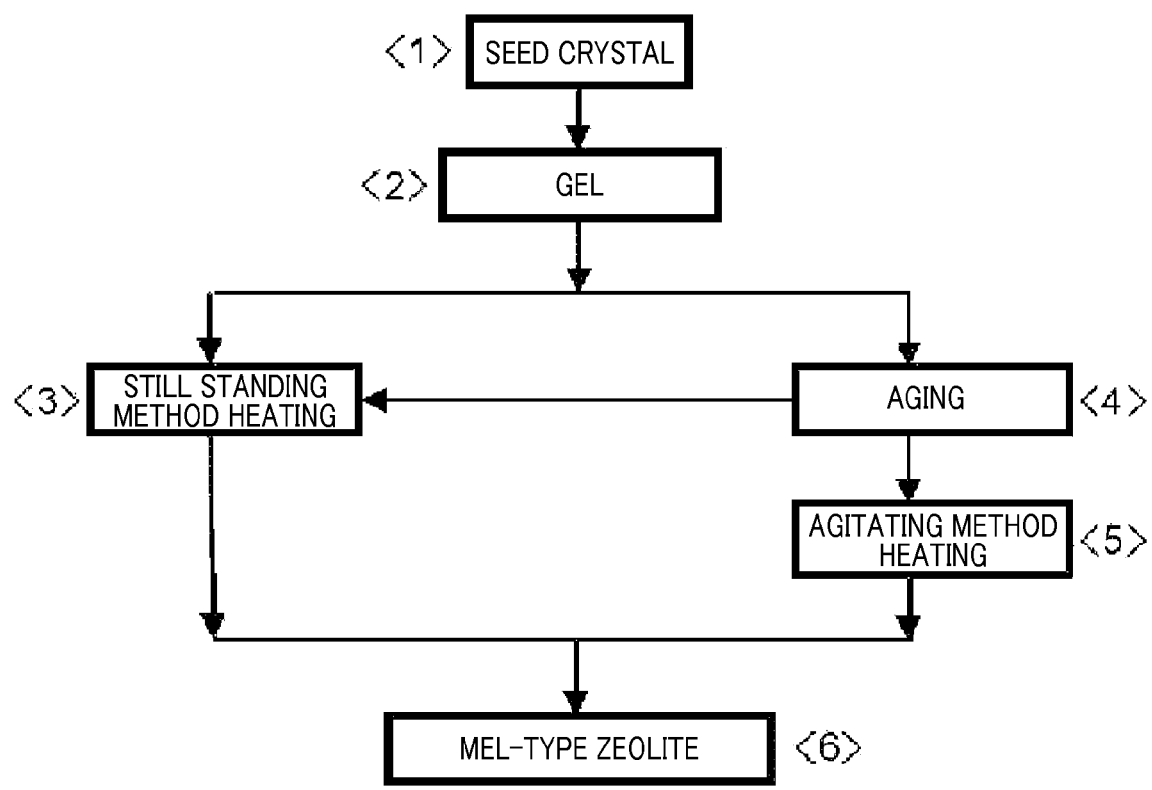

FE(II)-SUBSTITUTED MEL-TYPE ZEOLITE, PRODUCTION METHOD THEREFOR AND GAS ADSORBENT INCLUDING SAME, AND NITRIC OXIDE AND HYDROCARBON REMOVAL METHOD

TECHNICAL FIELD

The present invention relates to an Fe (II)-substituted MEL-type zeolite, a gas adsorbent including same and a production method therefor. The present invention also relates to an adsorbent for adsorbing and removing nitric oxide gas and hydrocarbon gas in a gas phase such as exhaust gas of an internal combustion engine, and to a method for removing nitric oxide gas and hydrocarbon gas from the gas phase.

BACKGROUND ART

It has been proposed that a zeolite obtained by being subjected to ionic exchange with iron ions is used as a vehicle exhaust gas purification catalyst (See, Patent Documents 1 to 3). In Patent Document 1, for example, a denitration catalyst comprising a carrier obtained by a beta-type zeolite having an $SiO_2/Al_2O_3$ molar ratio of 15 to 300 being subjected to ionic exchange with 0.1 to 15% by mass of $Fe^{2+}$ ions, and ferric oxide carried on the carrier is described.

In Patent Document 2, it is described that a beta-type zeolite having a skeletal structure in which Si percentage content assigned to $Q^4$ of zeolite skeleton as observed in $^{29}Si$ MAS NMR spectrum is 35-47% by mass and having an $SiO_2/Al_2O_3$ molar ratio of equal to or more than 20 but less than 100 is subjected to ionic exchange to cause it to carry $Fe^{3+}$ and to be brought into contact with exhaust gas containing nitrogen oxides.

In Patent Document 3, a method for producing an $NO_x$ adsorbing material is described. This method comprises an impregnating step of impregnating a ZSM-5, mordenite or beta-type zeolite with iron chloride aqueous solution to form an iron chloride-containing zeolite, an ionic exchange step of heating the iron chloride-containing zeolite at 330-500° C. under an atmosphere containing no water to cause Fe to be subjected to ionic exchange, and a heat treatment step of heat treating the iron chloride-containing zeolite after the ionic exchange step under a non-oxidizing atmosphere.

Patent Document 1: Pamphlet of PCT International Publication No. WO2006/011575
Patent Document 2: Japanese Unexamined Patent Application, Publication No. 2007-076990
Patent Document 3: Japanese Unexamined Patent Application, Publication No. 2008-264702

DISCLOSURE OF THE INVENTION

Problems to be Solved by the Invention

However, it is not easy to effectively adsorb and remove nitric oxide even using the material described above, if oxygen is present in exhaust gas at a high concentration or the temperature of the exhaust gas is low when nitric oxide is catalytically removed.

An object of the present invention is to provide an MEL-type zeolite which can solve various drawbacks of the prior art described above.

Means for Solving the Problems

As a result of keen examination, the present inventors have found that the above object can be achieved using an Fe (II)-substituted MEL-type zeolite obtained by being subjected to ionic exchange with Fe (II) and having a specific $SiO_2/Al_2O_3$ ratio.

That is, the present invention provides an Fe (II)-substituted MEL-type zeolite having an $SiO_2/Al_2O_3$ ratio in the range of 10-30 inclusive and obtained by being subjected to ionic exchange with Fe (II) ions.

The present invention also provides to a gas adsorbent comprising the Fe (II)-substituted MEL-type zeolite described above.

Furthermore, the present invention provides a method for producing an Fe (II)-substituted MEL-type zeolite, which comprises a step of dispersing an MEL-type zeolite having an $SiO_2/Al_2O_3$ ratio in the range of 10-30 inclusive in an Fe (II) water-soluble-compound aqueous solution and then mixing and agitating to cause the MEL-type zeolite to carry Fe (II) ions.

In addition, the present invention provides a method for removing nitric oxide, which comprises bringing an Fe (II)-substituted MEL-type zeolite having an $SiO_2/Al_2O_3$ ratio in the range of 10-30 inclusive and obtained by being subjected to ionic exchange with Fe (II) ions into contact with nitric oxide or nitric oxide-containing gas to cause nitric oxide to be adsorbed on the Fe (II)-substituted MEL-type zeolite.

Moreover, the present invention provides a method for removing hydrocarbons, which comprises bringing an Fe (II)-substituted MEL-type zeolite having an $SiO_2/Al_2O_3$ ratio in the range of 10-30 inclusive and obtained by being subjected to ionic exchange with Fe (II) ions into contact with hydrocarbons or hydrocarbon-containing gas to cause hydrocarbons to be adsorbed on the Fe (II)-substituted MEL-type zeolite.

Effects of the Invention

The present invention provides an Fe (II)-substituted MEL-type zeolite useful in catalytically removing various gases and a production method therefor. In particular, the present invention allows efficiently adsorbing and removing nitric oxide and hydrocarbons even with lesser amount of Fe (II) introduced in the MEL-type zeolite by substitution, when nitric oxide and hydrocarbons are catalytically removed.

BRIEF DESCRIPTION OF THE DRAWINGS

FIG. 1 is a flow chart for producing a pre-substituted MEL-type zeolite used in the present invention.

PREFERRED MODE FOR CARRYING OUT THE INVENTION

The present invention will be explained based on its preferred embodiment below. The present invention relates to an Fe (II)-substituted MEL-type zeolite obtained by an MEL-type zeolite being subjected to ionic exchange with Fe (II) ions. The present invention also relates to a gas adsorbent comprising the Fe (II)-substituted MEL-type zeolite. Fe (II) ions are carried on an MEL-type zeolite by being subjected to ionic exchange with cations present in $[AlO_2]$-site in the MEL-type zeolite. The important point in the present invention is that the iron ions subjected to ionic exchange with cations contained in the MEL-type zeolite are Fe (II) ions. A desired level of gas removal effect cannot be developed, if the iron ions subjected to ionic exchange with cations are Fe (III) ions. The present inventors believe that the reason for this relates to, as the MEL-type zeolite, using the one having particular physical property values described below.

Though the desired level of gas removal effect cannot be developed if the iron ions subjected to ionic exchange with cations are Fe (III) ions, this shall not preclude the Fe (II)-substituted MEL-type zeolite used in the present invention from carrying Fe (III) ions. That is, it is accepted that the Fe (II)-substituted MEL-type zeolite carries Fe (III) ions.

In the present invention, examples of gases targeted by adsorption using the Fe (II)-substituted MEL-type zeolite include nitric oxide gas and hydrocarbon gas which are contained in exhaust gas of an internal combustion engine. For hydrocarbon gas, the Fe (II)-substituted MEL-type zeolite of the present invention is especially useful in adsorbing alkanes such as methane, ethane, propane, butane, pentane, hexane, n-heptane and isooctane; alkenes such as ethylene, propylene, butene, pentene, methylpentene, hexene and methylhexene; aromatics such as benzene, toluene, xylene and trimethylbenzene and the like. If both nitric oxide and hydrocarbons are contained in the treatment target gas, both of these gases can be adsorbed simultaneously by using the Fe (II)-substituted MEL-type zeolite of the present invention.

The amount of Fe(II) contained in the Fe (II)-substituted MEL-type zeolite, that is, the loading amount preferably ranges from 0.001 to 0.4 mmol/g of the Fe (II)-substituted MEL-type zeolite, more preferably from 0.001 to 0.3 mmol/g, further preferably from 0.001 to 0.2 mmol/g and further more preferably from 0.001 to 0.15 mmol/g. The adsorption efficiency of nitric oxide and hydrocarbons can be effectively enhanced by setting the loading amount of Fe (II) within this range.

The loading amount of Fe (II) contained in the Fe (II)-substituted MEL-type zeolite is measured by the following method. First, an Fe (II)-substituted MEL-type zeolite to be measured is weighed. The Fe (II)-substituted MEL-type zeolite is dissolved by hydrogen fluoride (HF), and the total iron amount in the solution is determined using an inductively coupled plasma emission spectrophotometer. Apart from this, the amount of Fe (III) contained in the Fe (II)-substituted MEL-type zeolite to be measured is measured by $H_2$-TPR (temperature-programmed reduction). Then, the amount of Fe (II) is calculated by subtracting the amount of Fe (III) from the total iron amount.

In order to cause the MEL-type zeolite to carry Fe (II) ions, for example, the following method can be employed. The MEL-type zeolite is dispersed in an Fe (II) water-soluble-compound aqueous solution and then agitated and mixed. The MEL-type zeolite is preferably mixed at 0.5-7 parts by mass in relation to 100 parts by mass of the aqueous solution. The addition amount of the Fe (II) water-soluble-compound may be set suitably depending on the degree of ionic exchange.

Mixing and agitating may be performed at room temperature or under heating. The solution temperature is preferably set at 10-30° C., if mixing and agitating is performed under heating. Mixing and agitating may also be performed under an atmospheric environment or under an inert gas atmosphere such as a nitrogen atmosphere.

When mixing and agitating are performed, a compound to prevent Fe (II) from being oxidized to Fe (III) may be added in water. Such a compound is preferably ascorbic acid, a compound which does not obstruct ionic exchange of Fe (II) ions and can prevent Fe (II) ions from being oxidized to Fe (III) ions. The addition amount of ascorbic acid is preferably 0.1 to 3 times, particularly 0.2 to 2 times the amount by mole of Fe (II) to be added in terms of effectively preventing oxidization of Fe (II).

After mixing and agitating for a predetermined time, the solid content is sucked and filtered, washed with water and dried to give an Fe (II)-substituted MEL-type zeolite of interest. The X-ray diffraction diagram of the Fe (II)-substituted MEL-type zeolite is almost the same as the X-ray diffraction diagram of the MEL-type zeolite before causing it to carry Fe (II) ions. That is, the crystal structure of the zeolite is not changed by ionic exchange.

The Fe (II)-substituted MEL-type zeolite used in the present invention has an $SiO_2/Al_2O_3$ ratio in the range of 10-30 inclusive, preferably in the range of 12-24 inclusive and further preferably in the range of 12-21 inclusive. That is, the Fe (II)-substituted MEL-type zeolite has a lower $SiO_2/Al_2O_3$ ratio. In general, a lower $SiO_2/Al_2O_3$ ratio in the zeolite means more ionic exchange sites. In other words, it means high ability to carry Fe (II) ions. Unexpectedly, as a result of consideration of the present inventors, it has been proven that in the Fe (II)-substituted MEL-type zeolite having a lower $SiO_2/Al_2O_3$ ratio, the number of nitric oxide and hydrocarbon molecules which may be adsorbed on one Fe (II) ion can be increased. Thus, by using the Fe (II)-substituted MEL-type zeolite of the present invention, nitric oxide and hydrocarbons can be efficiently adsorbed.

The Fe (II)-substituted MEL-type zeolite of the present invention has preferably a BET specific surface area of 200 to 550 $m^2/g$, particularly 200 to 450 $m^2/g$ and especially 250 to 400 $m^2/g$, in addition to having the $SiO_2/Al_2O_3$ ratio described above. Besides, a micropore specific surface area preferably ranges from 180 to 450 $m^2/g$, particularly from 190 to 350 $m^2/g$ and especially from 190 to 280 $m^2/g$. Furthermore, a micropore volume preferably ranges from 0.08 to 0.25 $m^2/g$, particularly from 0.10 to 0.20 $m^2/g$ and especially from 0.10 to 0.15 $m^2/g$. Using, as the Fe (II)-substituted MEL-type zeolite, the one having these physical property values, nitric oxide and hydrocarbons adsorption properties can be improved. As will be described below, these physical property values do not greatly differ from the corresponding physical property values in the MEL-type zeolite before subjected to ionic exchange with Fe (II) ions.

The Fe (II)-substituted MEL-type zeolite used in the present invention is excellent particularly in the trap performance of nitric oxide and hydrocarbons discharged at cold start of an internal combustion engine. Since the temperature of a three-way catalyst is not sufficiently high at cold start of a gasoline engine or a diesel engine, it is difficult to effectively purify exhaust gas by the three-way catalyst. However, in addition to the three-way catalyst, by using an adsorbent (catalyst) containing the Fe (II)-substituted MEL-type zeolite used in the present invention, it is possible to trap nitric oxide contained in the exhaust gas of relatively low temperature at cold start and thereby purify the exhaust gas. On reaching the vicinity of the operating temperature of the three-way catalyst after a few minutes since cold start, nitric oxide and hydrocarbons that has been trapped in the Fe (II)-substituted MEL-type zeolite used in the present invention are released, and the released nitric oxide and hydrocarbons are purified by the three-way catalyst which has reached the operating temperature.

In the present invention, the MEL-type zeolite having particular physical property values is preferably used as an MEL-type zeolite which is subjected to ionic exchange with Fe (II) ions. In particular, the MEL-type zeolite used in the present invention (hereinafter referred to as "pre-substituted MEL-type zeolite" in comparison to Fe (II)-substituted MEL-type zeolite) is characterized in that it is an aluminum-rich zeolite having a lower $SiO_2/Al_2O_3$ ratio. Specifically, the pre-substituted MEL-type zeolite is an aluminum-rich zeolite having an $SiO_2/Al_2O_3$ ratio preferably in the range of 10-30 inclusive, more preferably in the range of 12-24 inclusive. Such an aluminum-rich pre-substituted MEL-type zeolite has a BET specific surface area of 190 to 420 m²/g and more preferably 190 to 370 m²/g, as measured in the sodium-type zeolite. In addition, a micropore specific surface area preferably ranges from 200 to 550 m²/g and more preferably from 380 to 500 m²/g, as measured in the sodium-type zeolite. Furthermore, a micropore volume preferably ranges from 0.08 to 0.25 cm³/g and more preferably from 0.10 to 0.20 cm³/g, as measured in the sodium-type zeolite.

As described above, the $SiO_2/Al_2O_3$ ratio, the BET specific surface area, the micropore specific surface area and the micropore volume values in the pre-substituted MEL-type zeolite do not greatly differ from the corresponding values in the Fe (II)-substituted MEL-type zeolite.

The pre-substituted MEL-type zeolite encompasses a sodium-type zeolite and further encompasses one that becomes an $H^+$-type by ionic exchange of sodium ions with protons. When the MEL-type zeolite is an $H^+$-type, the aforementioned specific surface area and the like are measured after protons are substituted with sodium ions. In order to convert the MEL-type zeolite from the sodium-type to the $H^+$-type, for example, the sodium-type MEL-type zeolite is dispersed in an aqueous solution of an ammonium salt such as an ammonium nitrate, and the sodium ions in the zeolite are substituted with ammonium ions. The ammonium-type MEL-type zeolite is fired, and thereby the $H^+$-type MEL-type zeolite is obtained.

The aforementioned specific surface area and volume are measured using a BET surface area measuring device as described in the following examples.

The aluminum-rich pre-substituted MEL-type zeolite having the aforementioned physical properties is suitably produced by the production method described below. The reason why in the present invention, the pre-substituted MEL-type zeolite could achieve the aforementioned physical properties is presumed to have been able to suppress the occurrence of defects that may occur in the crystal structure of the pre-substituted MEL-type zeolite obtained by using the production method, but the detailed are not clear.

Next, a preferred production method of the pre-substituted MEL-type zeolite will be described. The pre-substituted MEL-type zeolite is suitably produced by a method described in a prior application of the applicant: WO2012/002367A1. In more detail, it is produced by a method in which a reaction mixture (gel) comprising a silica source, an alumina source, an alkali source and water, and an MEL-type zeolite seed crystal are reacted. As the gel, the one is used, which has a composition so that when a zeolite is synthesized from only the gel, the synthesized zeolite comprises at least one of composite building units of an MEL-type zeolite of interest as its composite building unit. Since the MEL-type zeolite has a skeletal structure formed from three composite building units of mor, mel and mfi, by using a gel having a composition in which a mordenite that is a zeolite comprising at least one of the three composite building units is produced, an MEL-type zeolite having a lower $SiO_2/Al_2O_3$ ratio which is a zeolite of interest can be easily obtained.

Specifically, as the gel, that is, a gel having a composition in which a mordenite is produced, preferably, the one may be used, which is formed by mixing a silica source, an alumina source, an alkali source and water so that the composition having a molar ratio shown in the following (a) or (b) is achieved.

(a)
$SiO_2/Al_2O_3$=40-200, particularly 44-200
$Na_2O/SiO_2$=0.24-0.4, particularly 0.25-0.35
$H_2O/SiO_2$=10-50, particularly 15-25

(b)
$SiO_2/Al_2O_3$=10-40, particularly 12-40
$Na_2O/SiO_2$=0.05-0.25, particularly 0.1-0.25
$H_2O/SiO_2$=5-50, particularly 10-25

On the other hand, a seed crystal can be synthesized by the conventional method using an organic structure-directing agent (hereinafter, referred to as "organic SDA"). As an organic structure-directing agent suitably used in the synthesis of the MEL-type zeolite, for example, tetrabutylammonium hydroxide can be used. By agitating and heating the organic structure-directing agent along with the alumina source and the silica source in water, the MEL-type zeolite as a seed crystal can be obtained. Since the resulting zeolite is in the state of containing the organic structure-directing agent, it is removed by firing the zeolite in the air. The MEL-type zeolite thus obtained as a seed crystal has an $SiO_2/Al_2O_3$ ratio of about 30-70.

A preferred production method of the pre-substituted MEL-type zeolite will be described in more detail in reference to FIG. 1. In the present invention, in the same FIG., the production can be performed in the order of <1>, <2>, <3> and <6>. If this order is employed, a zeolite having a broader range of $SiO_2/Al_2O_3$ ratio can be produced. In the same FIG., the production can also be performed in the order of <1>, <2>, <4>, <3> and <6>. If this order is employed, by still standing and heating after aging, a seed crystal having a lower $SiO_2/Al_2O_3$ ratio can be effectively used in many cases. Furthermore, in FIG. 1, the production can be performed in the order of <1>, <2>, <4>, <5> and <6>. In this order, operations of aging and agitating are performed.

In each order above, the reaction mixture (gel) comprising a seed crystal is placed in an airtight vessel, heated and reacted to crystallize the MEL-type zeolite of interest. The gel contains no organic SDAs. Aging in the orders above refers to an operation of keeping the temperature lower than the reaction temperature for a certain period of time. In aging, in general, still standing is performed without agitating. It is known that aging has effects such as preventing by-production of impurities, allowing heating under agitation without by-production of impurities, and increasing the reaction rate. But their action mechanisms are not necessarily clear. The temperature and time of aging are set so that said effects can be maximally exhibited. In the present invention, aging is preferably performed at 20-80° C., more preferably at 20-60° C., preferably in the range of 2 hours to 1 day.

If the agitation is performed to achieve homogenization of the gel temperature during heating, heating and agitating after aging may prevent by-production of impurities (orders <1>, <2>, <4>, <5> and <6>). The agitation is performed in order to equalize the composition and temperature of the gel, and includes mixing with agitation blades and mixing by rotation of the vessel. The agitation intensity and speed of rotation may be adjusted depending on the temperature uniformity and the degree of impurities by-production. It may be intermittent agitation, not constant agitation. In this way, the combination of aging and agitation allows industrial mass production.

In either case of still standing method and agitating method, heating temperature ranges from 100 to 200° C., preferably from 120 to 180° C. and heating is performed under autogenous pressure. Generation efficiency of the MEL-type zeolite may become worse at temperatures below 100° C., since the crystallization rate becomes extremely slow. On the other hand, at temperatures higher than 200° C., since an autoclave with high pressure resistance is required, not only economic efficiency is lacked, but also generation rate of impurities increases. Heating time is not critical in the present production method, and heating may be performed until the MEL-zeolite with sufficiently high crystallinity is produced. In general, heating for about 5-240 hours provides the MEL-type zeolite with satisfactory crystallinity.

The crystal of the pre-substituted MEL-type zeolite of interest is obtained by said heating. After completion of heating, the produced crystalline powders are separated from the mother liquor by filtration, followed by washing with water or warm water and drying. Firing is not needed and it can be used immediately after dehydration is performed because it contains no organic materials in its dried state.

The silica source used in the reaction includes silica itself and a silicon-containing compound capable of forming silicate ions in water. Specifically, wet process silica, dry process silica, colloidal silica, sodium silicate, aluminosilicate gels and the like can be referred to. These silica sources can be used alone or in combination of two or more. Among these silica sources, the use of silica (silicon dioxide) is preferred in that it is possible to obtain a zeolite without unwanted by-products.

As the alumina source, for example, a water-soluble aluminum-containing compound can be used. Specifically, sodium aluminate, aluminum nitrate, aluminum sulfate and the like can be referred to. Furthermore, aluminum hydroxide is also one of the preferred alumina sources. These alumina sources can be used alone or in combination with two or more. Among these alumina sources, the use of sodium aluminate or aluminum hydroxide is preferred in that it is possible to obtain a zeolite without unwanted by-products (for example, sulfates and nitrates and the like).

As the alkali source, in the case of sodium, for example, sodium hydroxide can be used. In the case of using sodium silicate as the silica source or using sodium aluminate as the alumina source, sodium, an alkali metal component contained therein is considered as NaOH at the same time and it is also the alkali component. Thus, said $Na_2O$ is calculated as the sum of all alkali components in the reaction mixture (gel).

A method by which a uniform reaction mixture is easily obtained may be used as the order of addition of each raw material when preparing the reaction mixture. For example, at room temperature, an alumina source and a lithium source may be added to and dissolved in aqueous sodium hydroxide solution, followed by adding a silica source and agitating and mixing to give a uniform reaction mixture. A seed crystal is added while mixing with the silica source or after adding the silica source. Thereafter, the mixture is agitated and mixed to ensure uniform dispersion of the seed crystal. There is no restriction on the temperature when preparing the reaction mixture, and in general, the preparation may be performed at room temperature (20-25° C.)

The pre-substituted MEL-type zeolite thus obtained is subjected to ionic exchange with Fe (II) ions to become an Fe (II)-substituted MEL-type zeolite as mentioned above. The Fe (II)-substituted MEL-type zeolite may be used as a gas adsorbent for various gases such as nitric oxide and hydrocarbons in this state, or may be used as a gas adsorbent containing the Fe (II)-substituted MEL-type zeolite. Irrespective of the form of the Fe (II)-substituted MEL-type zeolite, various gases such as nitric oxide and hydrocarbons can be adsorbed on the Fe (II)-substituted MEL-type zeolite by bring the Fe (II)-substituted MEL-type zeolite into solid-gas contact with the gases.

In the present invention, in addition to the adsorption of nitric oxide gas and hydrocarbon gas by bringing nitric oxide gas and hydrocarbon gas themselves into contact with the Fe (II)-substituted MEL-type zeolite, by bringing nitric oxide gas and hydrocarbon gas-containing gas into contact with the Fe (II)-substituted MEL-type zeolite, nitric oxide gas and hydrocarbon gas therein can be adsorbed and removed therefrom. Examples of such gases include exhaust gas of an internal combustion engine fueled by hydrocarbons such as gasoline and light oil, and exhaust gas generated from various boilers and incinerators.

EXAMPLES

Hereinafter, the present invention will be described in more detail by examples. However, the scope of the present invention is not limited to such examples. Unless mentioned otherwise, "%" refers to "% by mass". Analyzers used in the examples, comparative examples and reference examples below are as follows. Powder X-ray diffraction device: powder X-ray diffraction device MO3XHF[22] (radiation of CuKα-ray, voltage of 40 kV, current of 30 mA, scan step of 0.02°, and scan speed of 2°/min) made by Mac Science Co., Ltd. $SiO_2/Al_2O_3$ ratio: An MEL-type zeolite was dissolved with hydrogen fluoride (HF) and the solution was analyzed using ICP to quantify Al. In addition, an MEL-type zeolite was dissolved with potassium hydroxide (KOH) and the solution was analyzed using ICP to quantify Si. The $SiO_2/Al_2O_3$ ratio was calculated based on the quantified amount of Si and Al. BET specific surface area, micropore specific surface area and micropore volume measuring device: AUTOSORB-1 made by Quantachrome Instruments Co., Ltd.

Example 1

(1) Production of Pre-Substituted MEL-Type Zeolite

This is an example of producing an Fe (II)-substituted MEL-type zeolite having an $SiO_2/Al_2O_3$ ratio of 19.0. In 12.88 g of pure water, 0.113 g of sodium aluminate and 2.582 g of 36% sodium hydroxide were dissolved to give an aqueous solution. A mixture of 2.427 g of finely powdered silica (Cab-O-Sil, M-5) and 0.243 g of seed crystals was gradually added to the aqueous solution, and agitated and mixed to give a gel. The seed crystals were produced by the following method. The gel had an $SiO_2/Al_2O_3$ ratio of 100, an $Na_2O/SiO_2$ ratio of 0.300 and an $H_2O/SiO_2$ ratio of 20, and when a zeolite was synthesized with only this, it had a composition in which a mordenite (MOR) was produced. The mixture of the gel and the seed crystals was put into a 60 cc stainless airtight vessel, and subjected to still standing and heating at 140° C. under autogenous pressure for 15 hours without aging and agitating. After cooling the airtight vessel, the product was filtered and washed with warm water to give a white powder. The product was an MEL-type zeolite containing no impurities. The physical property values of the pre-substituted MEL-type zeolite thus obtained are shown in Table 1.

[Production Method of MEL-Type Zeolite Seed Crystals]

Tetraethylammonium hydroxide was used as an organic SDA, and according to the conventional known method using sodium aluminate as an alumina source and finely powdered silica (Cab-O-Sil, M-5) as a silica source, an MEL-type zeolite was obtained by agitating and heating. The condition of agitating and heating was at 180° C. for 96 hours. The $SiO_2/Al_2O_3$ ratio of the MEL-type zeolite was 34.0. This was fired at 550° C. for 10 hours while circulating air in an electric furnace to produce a crystal containing no organic materials. This crystal was confirmed to be an MEL-type zeolite according to the result of X-ray diffraction. The MEL-type zeolite contained no SDAs. The MEL-type zeolite was used as a seed crystal.

(2) Production of Fe (II)-Substituted MEL-Type Zeolite

To a polypropylene vessel, 60 ml of distilled water, 1 g of the pre-substituted MEL-type zeolite and twice the molar amount of iron compounds to be added of ascorbic acid were added and then, 10% by mass of Fe (II) $SO_4.7H_2O$ in relation to the pre-substituted MEL-type zeolite was added and agitated at room temperature under nitrogen atmosphere for one day. Thereafter, the precipitate was sucked and filtered, washed with distilled water and dried to give an Fe (II)-substituted MEL-type zeolite carrying 0.041 mmol/g of $Fe^{2+}$. The loading amount of $Fe^{2+}$ was determined by the method described above. As a result of performing XRD measurement of the resulting Fe (II)-substituted MEL-type zeolite, it was observed that the peak position and the peak intensity were substantially the same as those of the pre-substituted MEL-type zeolite and it was confirmed that the structure of the MEL-type zeolite was maintained after ionic exchange.

(3) Evaluation of Nitric Oxide Gas Adsorption

Using an electronic balance, 20 mg of the Fe (II)-substituted MEL-type zeolite was weighed accurately, followed by using 180 mg of silicon carbide as a diluent and mixing them so as to be equal to each other. The mixture was packed in a quartz glass tube having an inner diameter of 6 mm. Adsorbed water during mixing was heated by a mantle heater to be removed, and then cooled to room temperature. Then, 5 cm³ of 1030 ppm nitric oxide gas was pulsed in the quartz glass tube at room temperature every 2 minutes. The amount of nitric oxide gas that had come out of the quartz glass tube without being adsorbed was calculated from peak areas of thermal conductivity-type gas chromatograph (GC-TCD, made by Shimadzu Corporation, GC-8A) and values detected by chemiluminescence-type NO analyzer (NOx analyzer, made by Yanagimoto Seisakusho Co., Ltd., ECL-77A). Measurement conditions of the thermal conductivity-type gas chromatograph (GC-TCD) are shown below. Then, the amount of nitric oxide gas adsorbed on the Fe (II)-substituted MEL-type zeolite per unit mass was determined by subtracting the calculated values from the supply amount of nitric oxide gas. The results are shown in Table 1 below.

[Measurement Conditions of Thermal Conductivity-Type Gas Chromatograph (GC-TCD)]

Carrier gas: He gas
Carrier gas flow rate: 30 cm³·min⁻¹
Detecting part temperature: 100° C.
Detecting part current: 80 mA (4) Evaluation of Toluene Gas Adsorption Toluene, which is typical of hydrocarbons contained in exhaust gas discharged from an internal combustion engine, was used as an adsorption target gas. In a quartz tube having an inner diameter of 4 mm, 20 mg of the Fe (II)-substituted MEL-type zeolite was placed, and held between quartz wool and glass beads. Helium was used as a mobile phase, and the sample was activated at 390° C. for about 1 hour. After cooling the column to 50° C., toluene was injected into the column until saturated. The amount of toluene gas that had come out of the quartz glass tube without being adsorbed was calculated from values detected as peak areas of thermal conductivity-type gas chromatograph (GC-TCD, made by Shimadzu Corporation, GC-8A). Measurement conditions of the thermal conductivity-type gas chromatograph (GC-TCD) are shown below. Then, the amount of toluene gas adsorbed on the Fe (II)-substituted MEL-type zeolite per unit mass was determined by subtracting the calculated values from the supply amount of toluene gas. The results are shown in Table 1 below.

[Measurement Conditions of Thermal Conductivity-Type Gas Chromatograph (GC-TCD)]

Carrier gas: He gas
Carrier gas flow rate: 30 cm³·min⁻¹
Detecting part temperature: 150° C.
Detecting part current: 50 mA Examples 2 and 3

An Fe (II)-substituted MEL-type zeolite was obtained in a similar way to Example 1, except that 20% by mass (Example 2) and 40% by mass (Example 3) of Fe (II) $SO_4.7H_2O$ in relation to the pre-substituted MEL-type zeolite were added. The loading amount of $Fe^{2+}$ was as shown in Table 1. The resulting Fe (II)-substituted MEL-type zeolite was evaluated in a similar way to Example 1. The results are shown in Table 1.

Example 4

(1) Production of Pre-Substituted MEL-Type Zeolite

This is an example of producing an Fe (II)-substituted MEL-type zeolite having an $SiO_2/Al_2O_3$ ratio of 15.4. A gel which had a composition of an $SiO_2/Al_2O_3$ ratio of 30, an $Na_2O/SiO_2$ ratio of 1.93 and an $H_2O/SiO_2$ ratio of 20 in Example 1 was used. In addition, an MEL-type zeolite having an $SiO_2/Al_2O_3$ ratio of 66.0 was used as a seed crystal. The seed crystal was produced by using tetraethylammonium hydroxide as an organic SDA like Example 1. A white powder was obtained in a similar way to Example 1 except for this. The product was subjected to XRD measurement to confirm that it was an MEL-type zeolite containing no impurities such as an SDA. The physical property values of the pre-substituted MEL-type zeolite thus obtained are shown in Table 1.

(2) Production of Fe (II)-Substituted MEL-Type Zeolite

To a polypropylene vessel, 60 ml of distilled water, 1 g of the pre-substituted MEL-type zeolite and twice the molar amount of iron compounds to be added of ascorbic acid were added, and then, 10% by mass of Fe (II) $SO_4.7H_2O$ in relation to the pre-substituted MEL-type zeolite was added and agitated at room temperature under nitrogen atmosphere for one day. Thereafter, the precipitate was sucked and filtered, washed with distilled water and dried to give an Fe (II)-substituted MEL-type zeolite carrying 0.029 mmol/g of $Fe^{2+}$. As a result of performing XRD measurement of the resulting Fe (II)-substituted MEL-type zeolite and the pre-substituted MEL-type zeolite, it was observed that the peak position and the peak intensity were substantially the same and it was confirmed that the structure of the MEL-type zeolite was maintained after ionic exchange. The resulting Fe (II)-substituted MEL-type zeolite was evaluated in a similar way to Example 1. The results are shown in Table 1.

Examples 5 and 6

An Fe (II)-substituted MEL-type zeolite was obtained in a similar way to Example 4, except that 20% by mass (Example 5) and 40% by mass (Example 6) of Fe (II) $SO_4.7H_2O$ in relation to the pre-substituted MEL-type zeolite were added. The loading amount of $Fe^{2+}$ was as shown in Table 1. The resulting Fe (II)-substituted MEL-type zeolite was evaluated in a similar way to Example 1. The results are shown in Table 1.

TABLE 1

| | Pre-substituted MEL-type zeolite | | | | Fe (II)-substituted MEL-type zeolite | | | | | |
|---|---|---|---|---|---|---|---|---|---|---|
| | $SiO_2/Al_2O_3$ | BET specific surface area ($m^2/g$) | Micropore specific surface area ($m^2/g$) | Micropore volume ($cm^3/g$) | $SiO_2/Al_2O_3$ | BET specific surface area ($m^2/g$) | Micropore specific surface area ($m^2/g$) | Micropore volume ($cm^3/g$) | Fe (II) loading amount (mmol/g) | NO adsorption amount (mmol/g) | Toluene adsorption amount ($cm^3/g$) |
| Example 1 | 19.0 | 319 | 214 | 0.11 | 19.0 | 337 | 262 | 0.13 | 0.041 | 0.033 | 0.022 |
| Example 2 | 19.0 | 319 | 214 | 0.11 | 19.0 | 295 | 257 | 0.13 | 0.088 | 0.068 | 0.017 |
| Example 3 | 19.0 | 319 | 214 | 0.11 | 19.0 | 320 | 275 | 0.14 | 0.122 | 0.089 | 0.019 |
| Example 4 | 15.4 | 317 | 212 | 0.11 | 15.4 | 289 | 244 | 0.12 | 0.029 | 0.035 | 0.015 |
| Example 5 | 15.4 | 317 | 212 | 0.11 | 15.4 | 264 | 196 | 0.10 | 0.066 | 0.062 | 0.012 |
| Example 6 | 15.4 | 317 | 212 | 0.11 | 15.4 | 265 | 231 | 0.11 | 0.093 | 0.108 | 0.014 |

As is apparent from the results shown in Table 1, it is understood that by using the Fe (II)-substituted MEL-type zeolite obtained in each Example, nitric oxide gas and toluene gas can be efficiently adsorbed and removed.

The invention claimed is:

1. An Fe(II)-substituted MEL-type zeolite having an $SiO_2/Al_2O_3$ ratio in the range of 10-30 inclusive and obtained by being subjected to ionic exchange with Fe(II) ions, wherein the loading amount of Fe(II) is in the range of 0.001-0.4 mmol/g of the Fe(II)-substituted MEL-type zeolite.

2. The Fe(II)-substituted MEL-type zeolite according to claim 1, wherein as the MEL-type zeolite before subjected to ionic exchange with Fe(II) ions, the MEL-type zeolite having an $SiO_2/Al_2O_3$ ratio in the range of 10-30 inclusive is used.

3. The Fe(II)-substituted MEL-type zeolite according to claim 1, wherein a BET specific surface area ranges from 200 to 550 $m^2/g$; a micropore specific surface area ranges from 180 to 450 $m^2/g$; and a micropore volume ranges from 0.08 to 0.25 $cm^3/g$.

4. A method for producing an Fe(II)-substituted MEL-type zeolite according to claim 1, which comprises a step of dispersing an MEL-type zeolite having an $SiO_2/Al_2O_3$ ratio in the range of 10-30 inclusive in an Fe(II) water-soluble-compound aqueous solution and then mixing and agitating to cause the MEL-type zeolite to carry Fe(II) ions.

5. The method according to claim 4, wherein 0.1 to 3 times the amount by mole of the Fe(II) of ascorbic acid is added to the aqueous solution upon the mixing and agitating.

6. A method for removing nitric oxide, which comprises bringing an Fe(II)-substituted MEL-type zeolite according to claim 1 into contact with nitric oxide or nitric oxide-containing gas to cause nitric oxide to be adsorbed on the Fe(II)-substituted MEL-type zeolite.

7. A method for removing hydrocarbons, which comprises bringing an Fe(II)-substituted MEL-type zeolite according to claim 1 into contact with hydrocarbons or hydrocarbon-containing gas to cause hydrocarbons to be adsorbed on the Fe(II)-substituted MEL-type zeolite.

8. The method according to claim 6, wherein the nitric oxide-containing gas is an exhaust gas of low temperature at cold start of an internal combustion engine.

9. The method according to claim 7, wherein the hydrocarbon-containing gas is an exhaust gas of low temperature at cold start of an internal combustion engine.

10. An Fe(II)-substituted MEL-type zeolite having an $SiO_2/Al_2O_3$ ratio in the range of 10-24 inclusive and obtained by being subjected to ionic exchange with Fe(II) ions, wherein the loading amount of Fe(II) is in the range of 0.001-0.4 mmol/g of the Fe(II)-substituted MEL-type zeolite.

11. The Fe(II)-substituted MEL-type zeolite according to claim 10, wherein as the MEL-type zeolite before subjected to ionic exchange with Fe(II) ions, the MEL-type zeolite having an $SiO_2/Al_2O_3$ ratio in the range of 10-24 inclusive is used.

12. An Fe(II)-substituted MEL-type zeolite having an $SiO_2/Al_2O_3$ ratio in the range of 10-21 inclusive and obtained by being subjected to ionic exchange with Fe(II) ions, wherein the loading amount of Fe(II) is in the range of 0.001-0.4 mmol/g of the Fe(II)-substituted MEL-type zeolite.

13. The Fe(II)-substituted MEL-type zeolite according to claim 12, wherein as the MEL-type zeolite before subjected to ionic exchange with Fe(II) ions, the MEL-type zeolite having an $SiO_2/Al_2O_3$ ratio in the range of 10-21 inclusive is used.

14. The Fe(II)-substituted MEL-type zeolite according to claim 10, wherein a BET specific surface area ranges from 200 to 550 $m^2/g$; a micropore specific surface area ranges from 180 to 450 $m^2/g$; and a micropore volume ranges from 0.08 to 0.25 $cm^3/g$.

15. The Fe(II)-substituted MEL-type zeolite according to claim 12, wherein a BET specific surface area ranges from 200 to 550 $m^2/g$; a micropore specific surface area ranges from 180 to 450 $m^2/g$; and a micropore volume ranges from 0.08 to 0.25 $cm^3/g$.

16. A method for removing nitric oxide, which comprises bringing an Fe(II)-substituted MEL-type zeolite according to claim 10 into contact with nitric oxide or nitric oxide-containing gas to cause nitric oxide to be adsorbed on the Fe(II)-substituted MEL-type zeolite.

17. A method for removing nitric oxide, which comprises bringing an Fe(II)-substituted MEL-type zeolite according to claim 12 into contact with nitric oxide or nitric oxide-containing gas to cause nitric oxide to be adsorbed on the Fe(II)-substituted MEL-type zeolite.

18. A method for removing hydrocarbons, which comprises bringing an Fe(II)-substituted MEL-type zeolite according to claim 10 into contact with hydrocarbons or hydrocarbon-containing gas to cause hydrocarbons to be adsorbed on the Fe(II)-substituted MEL-type zeolite.

19. A method for removing hydrocarbons, which comprises bringing an Fe(II)-substituted MEL-type zeolite according to claim 12 into contact with hydrocarbons or hydrocarbon-containing gas to cause hydrocarbons to be adsorbed on the Fe(II)-substituted MEL-type zeolite.

* * * * *